United States Patent
Rama et al.

(10) Patent No.: US 10,550,306 B2
(45) Date of Patent: Feb. 4, 2020

(54) PERMEABILITY MODIFICATION OF SUBTERRANEAN FORMATION FOR CONSOLIDATION TREATMENTS

(71) Applicant: Halliburton Energy Services, Inc., Houston, TX (US)

(72) Inventors: Mallikarjuna Shroff Rama, Pune (IN); Sushant Dattaram Wadekar, Pune (IN); Jag Pravesh, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/750,070

(22) PCT Filed: Sep. 4, 2015

(86) PCT No.: PCT/US2015/048584
§ 371 (c)(1),
(2) Date: Feb. 2, 2018

(87) PCT Pub. No.: WO2017/039691
PCT Pub. Date: Mar. 9, 2017

(65) Prior Publication Data
US 2018/0223170 A1    Aug. 9, 2018

(51) Int. Cl.
| | | |
|---|---|---|
| E21B 33/138 | (2006.01) | |
| E21B 43/22 | (2006.01) | |
| C09K 8/502 | (2006.01) | |
| C09K 8/508 | (2006.01) | |
| C09K 8/565 | (2006.01) | |

(Continued)

(52) U.S. Cl.
CPC ............ *C09K 8/502* (2013.01); *C09K 8/508* (2013.01); *C09K 8/565* (2013.01); *C09K 8/5751* (2013.01); *E21B 43/025* (2013.01)

(58) Field of Classification Search
CPC ............ E21B 2049/085; E21B 43/28; E21B 47/0005; E21B 43/26; E21B 33/13
See application file for complete search history.

(56) References Cited

U.S. PATENT DOCUMENTS 3,316,966 A   5/1967  Dear
5,423,381 A   6/1995  Surles et al.
(Continued)

FOREIGN PATENT DOCUMENTS

WO    2001083942    11/2001

OTHER PUBLICATIONS

International Search Report and Written Opinion for Application No. PCT/US2015/048584 dated May 30, 2016.
(Continued)

*Primary Examiner* — Zakiya W Bates
(74) *Attorney, Agent, or Firm* — Thomas Rooney; C. Tumey Law Group PLLC

(57) ABSTRACT

A consolidation treatment method may include introducing a permeability modifier into a subterranean formation comprising zones of heterogeneous permeability; introducing a treatment fluid into the subterranean formation subsequent to the permeability modifier, wherein the permeability modifier at least partially diverts the treatment fluid in the subterranean formation such that treatment of the subterranean formation with the treatment fluid is more uniform, and wherein the permeability modifier has a higher viscosity than the treatment fluid; and consolidating one or more zones of the subterranean formation.

18 Claims, 8 Drawing Sheets

(51) Int. Cl.
C09K 8/575 (2006.01)
E21B 43/02 (2006.01)

(56) References Cited

U.S. PATENT DOCUMENTS

| | | |
|---|---|---|
| 7,500,521 B2 | 3/2009 | Nguyen et al. |
| 8,017,561 B2 | 9/2011 | Nguyen |
| 8,991,495 B2 | 3/2015 | Curtice |
| 2009/0203555 A1 | 8/2009 | Milne et al. |
| 2010/0186954 A1 | 7/2010 | Nguyen et al. |
| 2013/0014951 A1 | 1/2013 | Fitzpatrick |
| 2015/0122494 A1 | 5/2015 | Vo et al. |
| 2017/0190962 A1 | 7/2017 | Raysoni et al. |
| 2017/0247602 A1 | 8/2017 | Belakshe et al. |

OTHER PUBLICATIONS

Halliburton, Material Safety Data Sheet: LCA-1, Dated Jul. 22, 2011.

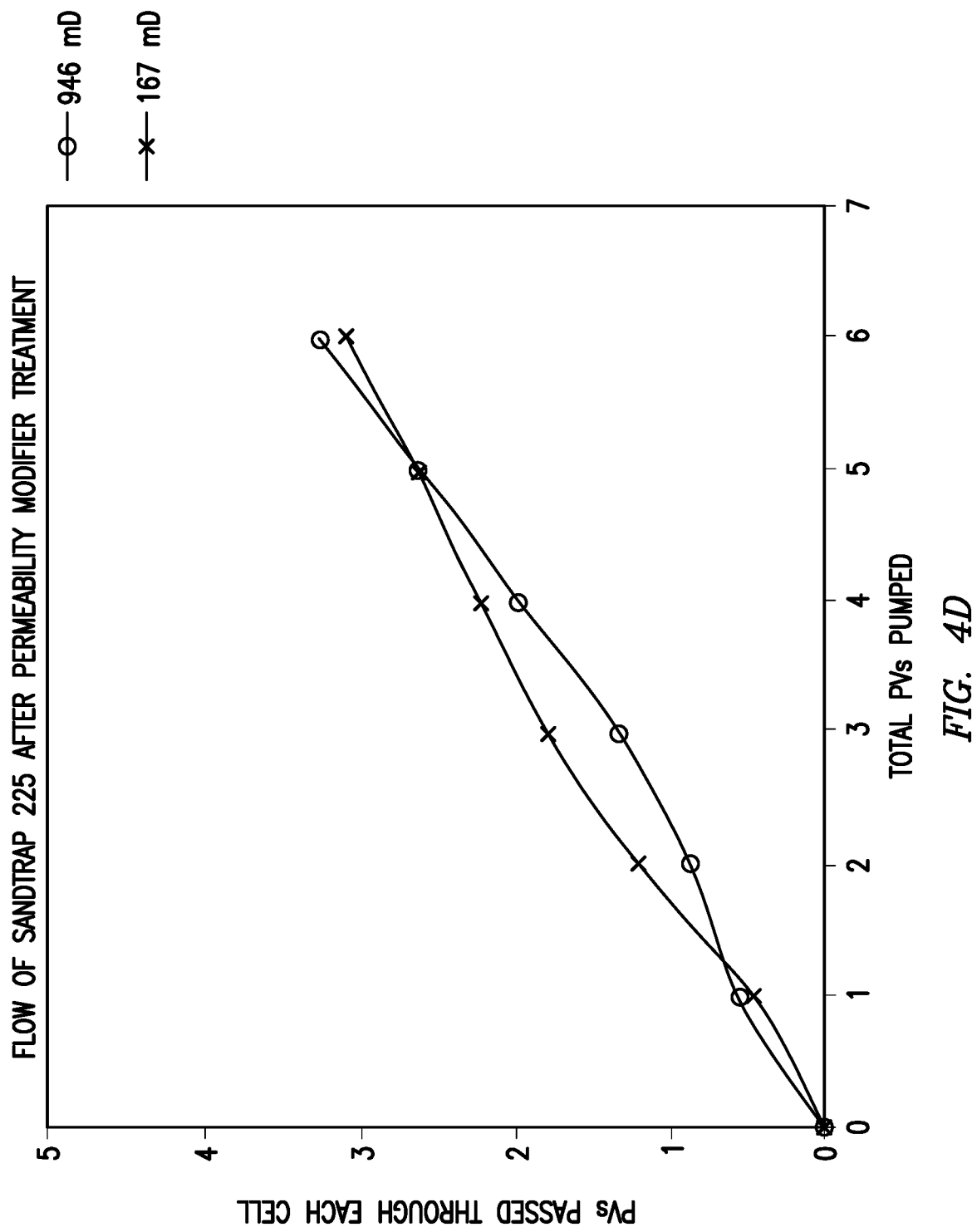

PERMEABILITY MODIFICATION OF SUBTERRANEAN FORMATION FOR CONSOLIDATION TREATMENTS

BACKGROUND

The present disclosure relates to treatment of subterranean formations and, in specific examples, to altering the permeability of the near wellbore region of a subterranean formation such that a treatment fluid may be uniformly applied to the near wellbore region in consolidation treatments.

In soft formations or formations that may have little or no natural cementation, sand and other fines, collectively referred to herein as "unwanted solids," may be produced along with the hydrocarbons. Unwanted solid production can plug wells, erode equipment, and reduce well productivity. Failure to successfully control unwanted solids may lead to loss of profitable production or even the abandonment of the project. In certain producing regions, solids control completions are the dominant type and result in considerable added expense to operations. Over the life of such wells, the ratio of unwanted solids to hydrocarbons recovered may be undesirable in view of the cost of producing the unwanted solids, separating them from the hydrocarbons, and disposing of them, which may result in a significant economic loss.

A variety of techniques have been used to control unwanted solids. One method of solids control is to produce fluids from the formation at flow rates low enough to not affect the stability of sand bridges and other sand formations. However, instability and collapse of sand formations may still occur due to pressure cycling or unintentional error in setting production rates. Another technique for controlling solids comprises placing a gravel pack to provide a physical barrier to solids movement. Gravel packs, however, may be difficult to install and expensive. Further, it may be difficult to determine an appropriate screen size and gravel packs may also be subject to screen erosion and screen plugging. Sometimes chemical treatments, referred to herein as "consolidation treatments" are used. Consolidation treatments typically involve chemically binding the unwanted solids particles that make up the formation matrix while simultaneously maintaining sufficient permeability to ensure desirable production rates. However, formation permeabilities may vary and the treatment fluids used in the consolidation treatment may selectively enter the zones in the near wellbore region of the subterranean formation with the highest permeabilities. Unwanted solids in zones with low permeability may then escape treatment and remain a problem during production. Further, lack of uniform treatment may waste treatment fluids and increase downtime, consequently increasing operational expenses.

BRIEF DESCRIPTION OF THE DRAWINGS

These drawings illustrate certain aspects of some of the embodiments of the present invention, and should not be used to limit or define the invention.

FIG. 4D is another graph illustrating the permeabilities of two sand packs after treatment with a permeability modifier.

DETAILED DESCRIPTION

Figure 1:
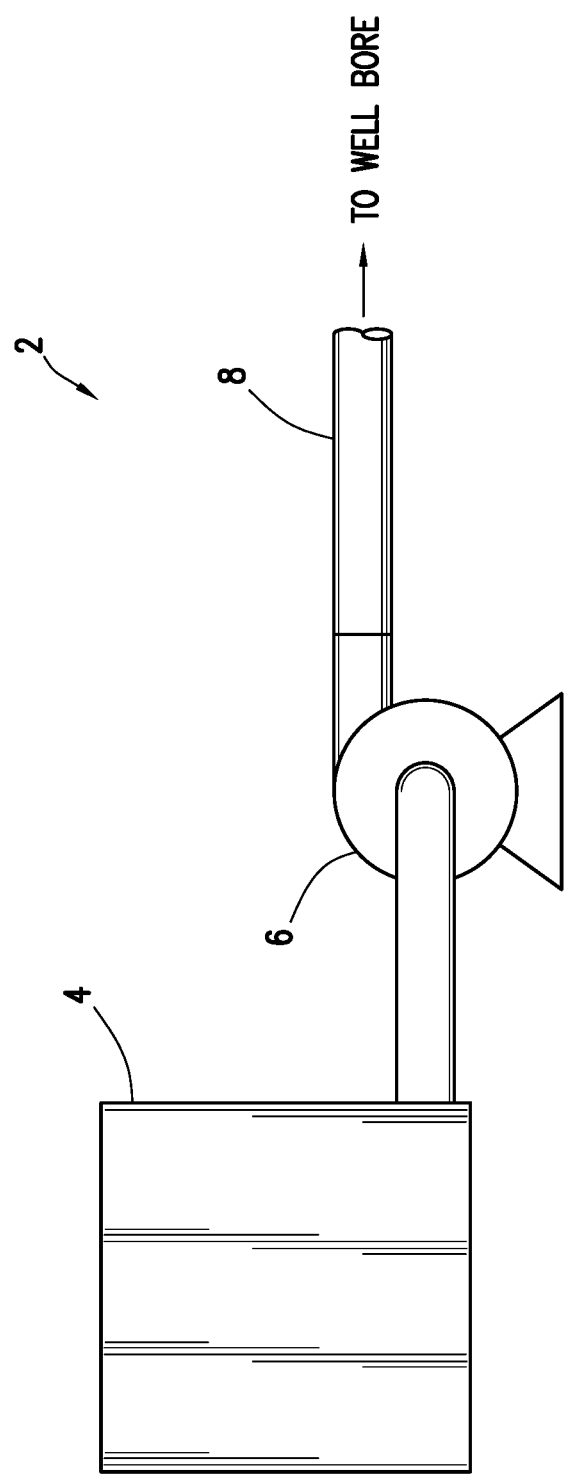
FIG. 1 is a schematic illustration of an example fluid handling system for the preparation and delivery of a permeability modifier into a wellbore.

The present disclosure relates to treatment of subterranean formations and, in specific examples, to altering the permeability of the near wellbore region of a subterranean formation such that a treatment fluid may be uniformly applied to the near wellbore region in consolidation treatments. Advantageously, the permeability modifier may equalize the permeability amongst the zones of a near wellbore portion of a subterranean formation such that the resistance to fluid flow amongst the temporarily zones approaches parity. As used herein, the term "zone" simply refers to a portion of the formation and does not imply a particular geological strata or composition. Advantageously, the permeability modifier may be used to reduce costs, reduce environmental burden, and improve employee safety.

The permeability modifier may comprise a small volume of high viscosity fluid. "High viscosity" as used to describe the permeability modifier is a relative term defined as a viscosity which is higher than a fluid pumped subsequent to the permeability modifier and that is to be diverted by the permeability modifier. For example, if it is desired to pump a pre-flush treatment fluid used to prepare the surface of the permeable pores of the subterranean formation for a consolidation treatment (e.g., a resin treatment); the permeability modifier pumped prior to the pre-flush fluid will have a higher viscosity than the pre-flush fluid. The subsequently pumped fluid is the fluid pumped next in the fluid sequence. Therefore, the viscosity of the permeability modifier is always relative to the next fluid pumped in the treatment sequence.

The permeability modifier may comprise any suitably viscous fluid which is compatible with the subterranean formation and with the subsequently pumped fluid. Examples of suitable permeability modifiers may include any polymeric liquid. Examples of polymeric liquids may include silicone oils, cross-linked gels such as polyacrylamide, the like, or combinations thereof. Hydrocarbon oils may be used as the permeability modifier, examples of which may include, but are not limited to, mineral oil, paraffin oil, kerosene oil, diesel oil, the like, or combinations thereof. Vegetable oils may be used as the permeability modifier, examples of which may include, but are not limited to, castor oil, corn oil, peanut oil, olive oil, palm oil, soybean oil, the like, or combinations thereof. Resins may be used as the permeability modifier. As used herein, the term "resin" refers to any of a number of physically similar polymerized synthetics or chemically modified natural resins including thermoplastic materials and thermosetting materials. Examples of hardenable resins that may be used include, but are not limited to, epoxy-based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, bisphenol A diglycidyl ether resins, butoxymethyl butyl glycidyl ether resins, bisphenol A-epichlorohydrin resins, bisphenol F resins, glycidyl ether resins, polyester resins and hybrids and copolymers thereof, polyurethane resins and hybrids and copolymers thereof, acrylate resins, and mixtures thereof. Ethoxylated amines may also be used as the permeability modifier. Examples of ethoxylated amines may include, but are not limited to, bis-(2-hydroxyethyl) isodecyloxypropylamine, poly (5) oxyethylene isodecyloxypropylamine, bis-(2-hydroxyethyl) isotridecyloxypropylamine, poly (5) oxyethylene isotridecyloxypropyl amine, bis-(2-hydroxyethyl) linear alkyloxypropylamine, bis (2-hydroxyethyl) soya amine, poly (15) oxyethylene soya amine, bis (2-hydroxyethyl) octadecylamine, poly (5) oxyethylene octadecylamine, poly (8) oxyethylene octadecylamine, poly (10) oxyethylene octadecylamine, the like, and mixtures thereof. Polyamines may also be used as the permeability modifier. Examples of polyamines may include, but are not limited to, ethylene diamine, 1,3-diaminopropane, hexamethylenediamine, the like, and mixtures thereof.

The permeability modifier may be an oleaginous permeability modifier compatible with consolidation treatments using oleaginous fluids, for example, an oleaginous pre-flush, an oleaginous solids consolidating fluid, and/or an oleaginous post-flush fluid. Alternatively, the permeability modifier may be an aqueous permeability modifier compatible with consolidation treatments using aqueous fluids, for example, an aqueous pre-flush, an aqueous solids consolidating fluid, and/or an aqueous post-flush fluid. Viscosity modifying agents may be added to the permeability modifiers, however care should be maintained to not add any additive which may damage the formation and permanently reduce permeability. If using cross-linked gels, a breaker may be used to break the cross-linking and regain permeability to the affected zone when permeability modification is no longer desirable.

The permeability modifier may have a viscosity in a range of 3 cP to about 3000 cP. The permeability modifier may be used to modify the permeability of a formation prior to the pumping of a pre-flush fluid, solids consolidating fluid, and/or post-flush fluid. Therefore, the permeability modifier may be used in all stages of a consolidation treatment. Generally, and without limitation, the permeability modifier may comprise about 10% to about 50% of the volume of the subsequently pumped fluid to be diverted. For example, the permeability modifier may comprise about 10% of the volume, about 20% of the volume, about 30% of the volume, about 40% of the volume, or about 50% of the volume of the subsequently pumped fluid. Alternatively about 1 pore volume to about 6 pore volumes of permeability modifier may be used to treat the near wellbore region of the subterranean formation. For example, about 1 pore volume may be used, about 2 pore volumes may be used, about 3 pore volumes may be used, about 4 pore volumes may be used, about 5 pore volumes may be used, or about 6 pore volumes may be used to treat the near wellbore region of the subterranean formation. The amount of permeability modifier used may be dependent upon the volume of the subsequently pumped fluid, the viscosity of the subsequently pumped fluid, and other factors. Generally, and without limitation, the viscosity of the permeability modifier fluid may be about 2 to about 5 times the viscosity of the subsequently pumped fluid. For example, the permeability modifier fluid may be about 2 times more viscous, about 3 times more viscous, about 4 times more viscous, about 5 times more viscous, about 10 times more viscous, about 50 times more viscous, about 100 times more viscous or about 500 times more viscous than the subsequently pumped fluid.

The techniques disclosed herein may be used for consolidation operations, e.g., sand control. The system may be a single step system comprising pumping the permeability modifier prior to the desired treatment fluid. The permeability modifier may typically not require post flush with solvents for consolidation treatments. Instead, the permeability modifier may be temporarily placed and eventually the subsequently pumped treatment fluid may gradually push the permeability modifier out of the near wellbore region restoring the permeability of the zone into which the permeability modifier was placed. The composition can be used in formations comprising a wide range of permeabilities, for example, 30 mD to 13,000 mD. The permeability modifier may be used in both oleaginous and aqueous systems. The permeability modifier may be used in both emulsions wherein the continuous phase is either an oleaginous or aqueous fluid.

In consolidation treatments, the permeability modifier may alter the permeability of high permeability zones, such that subsequently pumped treatment fluids, for example, pre-flush fluids, solids consolidating fluids (e.g., resin treatments), and post-flush fluids may be applied more uniformly to the zones of the near wellbore region of the subterranean formation. It is to be understood that the subsequent treatment may not be exactly uniform, but in examples the permeability modifier may alter the permeability of the high permeability zone such that it approaches the permeability of a low permeability zone with which it may be compared.

In examples, a pre-flush fluid may be used to prepare the surface of the permeable pores of the subterranean formation for a consolidation treatment (e.g., a solids consolidating fluid). A post-flush fluid may be used to help ensure the permeability of the treated portion of the subterranean formation is not reduced by displacing the solids consolidating fluid from the pores and leaving a thin film on formation grains while maintaining a concentration at the grain-to-grain contact points. As a result, permeability may be reestablished in the treated zones with reduced sand production.

The pre-flush and post-flush fluids may include any aqueous-based or oleaginous-based fluid that does not adversely interact with the other components used in accordance with this invention or with the subterranean formation. The pre-flush and/or post-flush fluid may comprise a surfactant. Any surfactant compatible with later-used treatments may be used, for example, to aid a solids consolidating fluid in flowing to the contact points between adjacent particulates in the subterranean formation. Such surfactants may include, but are not limited to, ethoxylated nonyl phenol phosphate esters, mixtures of one or more cationic surfactants, one or more non-ionic surfactants, and an alkyl phosphonate surfactant. Suitable mixtures of one or more cationic and nonionic surfactants may be used. A specific example of a suitable surfactant is C12-C22 alkyl phosphonate. The surfactant or surfactants used may be included in the pre-flush or post-flush fluids in any sufficient amount. In some embodiments of the present invention, the surfactant is present in the pre-flush or post-flush fluid in an amount in the range of from about 0.1% to about 10% by weight of the pre-flush or post-flush fluid.

A solids consolidating fluid (e.g., a resin treatment) may consolidate unwanted solids such as sand and may even agglomerate other types of unwanted solids such as fines. Fines, as defined herein, are any type of unwanted solid particle that will not be removed by a shaker screen. The consolidation of unwanted solids, such as sand may be done to stabilize the subterranean formation and also so that the sand is not produced. Production of unwanted solids such as sand may damage well equipment and/or the subterranean formation. Conversely, fines may typically be produced so as to avoid near-wellbore damage. The agglomeration of the fines, should such agglomeration reach a sufficient level, may allow for the fines to not be produced in a manner similar to consolidated unwanted solids such as sand. Further, the agglomeration of the fines may allow for the fines that are produced to be filtered using shaker screens or any other sufficient filtration method, whereas non-agglomerated fines may not be removed via shaker screens.

Resins suitable for use as a solids consolidating fluid include any resin that is capable of forming a hardened, consolidated mass. Many such resins are commonly used in consolidation treatments, and some suitable resins include two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof. Some suitable resins, such as epoxy resins, may be cured with an internal catalyst or activator so that when pumped downhole, they may be cured using only time and temperature. Other suitable resins, such as furan resins generally require a time-delayed catalyst or an external catalyst to help activate the polymerization of the resins if the cure temperature is low (i.e., less than 250° F.) but will cure under the effect of time and temperature if the formation temperature is above about 250° F., preferably above about 300° F.

Selection of a suitable resin may be affected by the temperature of the subterranean formation to which the solids consolidating fluid will be introduced. By way of example, for subterranean formations having a bottom hole static temperature ("BHST") ranging from about 60° F. to about 250° F., two component epoxy based resins comprising a hardenable resin component and a hardening agent component containing specific hardening agents may be preferred. For subterranean formations having a BHST ranging from about 300° F. to about 600° F., a furan based resin may be preferred. For subterranean formations having a BHST ranging from about 200° F. to about 400° F., either a phenolic based resin or a one component HT epoxy based resin may be suitable. For subterranean formations having a BHST of at least about 175° F., a phenol/phenol formaldehyde/furfuryl alcohol resin may also be suitable. With the benefit of this disclosure, one of ordinary skill in the art will be able to recognize and select a suitable resin for use in consolidation treatment applications.

In some examples, a solvent may be used with a resin in the solids consolidating fluid. Any solvent that is compatible with the chosen resin and achieves the desired viscosity effect may be suitable for use. Some preferred solvents are those having high flash points (e.g., about 125° F.); such solvents may include, but are not limited to, butyl lactate, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d-limonene, fatty acid methyl esters, or combinations thereof. Other solvents may include aqueous dissolvable solvents such as, methanol, isopropanol, butanol, glycol ether solvents, and combinations thereof. Suitable glycol ether solvents may also be used, examples may include, but are not limited to, diethylene glycol methyl ether, dipropylene glycol methyl ether, 2-butoxy ethanol, ethers of a C2 to C6 dihydric alkanol containing at least one C1 to C6 alkyl group, mono ethers of dihydric alkanols, methoxypropanol, butoxyethanol, hexoxyethanol, and isomers thereof. Selection of an appropriate solvent may be dependent on the resin chosen.

The solids consolidating fluid, pre-flush fluid, and/or post-flush fluid may comprise any number of additional additives, including, but not limited to, salts, surfactants, acids, fluid loss control additives, gas, foamers, corrosion inhibitors, scale inhibitors, catalysts, clay control agents, biocides, friction reducers, antifoam agents, bridging agents, dispersants, flocculants, $H_2S$ scavengers, $CO_2$ scavengers, oxygen scavengers, lubricants, viscosifiers, breakers, weighting agents, particulate materials (e.g., proppant particulates) and the like. In certain embodiments the solids consolidating fluid, pre-flush fluid, and/or post-flush fluid may comprise an activator or catalyst which may be used, inter alia, to activate the polymerization of the resin. With the benefit of this disclosure, one of ordinary skill in the art will be able to recognize and select a suitable additive for use in a solids consolidating fluid, pre-flush fluid, and/or post-flush fluid.

As discussed, the permeability modifier may be selectively used prior to any stage of a consolidation treatment, for example, the permeability modifier may be used prior to the introduction of the pre-flush fluid, prior to introduction of the solids consolidating fluid, or prior to introduction of the post-flush fluid. Further, if desired, the permeability modifier may be used prior to multiples stages of a consolidation treatment, for example, prior to both pre-flush fluids and prior to solids consolidating fluids; or may also be used prior to every stage of consolidation treatment, for example, prior to pre-flush fluid, prior to the solids consolidating fluid, and prior to the post-flush fluid.

The permeability modifiers may be liquids and may generally leave no particles or residues behind. They may generally be compatible with the formation and may not damage the formation. Unlike other types of permeability modifiers, or the use of diverter materials and solid particles, the permeability modifier described herein may typically be a temporary modifier of permeability and may be pushed further into the subterranean formation and out of the near wellbore region such that the permeability modification of the near wellbore region lasts only so long as the permeability modifier remains therein. The method may be suitable for onshore and offshore operations.

Without limitation by theory, the permeability modifier may function by selectively entering the high permeability zone or zones of a near wellbore region of a subterranean formation. In this example, the subterranean formation comprises at least two zones of differing permeabilities. Once introduced, the permeability modifier modifies the permeability of the high permeability zone or zones. The permeability modifier provides increased resistance to the flow of any subsequently pumped treatment fluids in these high permeability zones, thus the permeability of these high permeability zones is decreased and their permeability may approach that of the low permeability zones in which the permeability modifier was not introduced (i.e., the zone or zones in which the permeability modifier did not selectively enter). As such, a more uniform application of the treatment fluid amongst the near wellbore zones of the subterranean formation may be possible, as compared to treatment of the zones without the use of the permeability modifier. As the permeabilities of the zones approach parity, the permeability modifier disposed within the high permeability zones may be pushed out of the near wellbore region by the next subsequently pumped fluid or other subsequently pumped treatment fluids, and flow further into the formation restoring the uneven permeability of the treated zone for subsequent fluid production.

The permeability modifier optionally may comprise an oleaginous base fluid, for example, in some instances when the permeability modifier may need to be diluted. In some examples, the base fluid itself may possess dual functionality such that it carries a permeability modifier, for example a resin or polyamine and may also be a viscous fluid with a high viscosity fluid and therefore functions as a permeability modifier itself. Suitable oleaginous base fluids may comprise, without limitation, silicone oil, diesel oil, kerosene oil, paraffinic oil, or any other suitable oleaginous fluids that preferably do not undesirably interact with the subterranean formation, the permeability modifier, or a subsequently pumped treatment fluid. The amount of oleaginous base fluid included may range, without limitation, from about 5% to about 99% by weight of the total composition.

The permeability modifier optionally may comprise an aqueous base fluid, for example in some instances when a cross-linked gel may be used. Suitable aqueous base fluids may comprise, without limitation, freshwater, saltwater, brine, seawater, or any other suitable aqueous fluids that preferably do not undesirably interact with the subterranean formation, the permeability modifier, or a subsequently pumped treatment fluid. The amount of aqueous base fluid included may range, without limitation, from about 5% to about 99% by weight of the total composition. Alternatively, the permeability modifier optionally may comprise any nonaqueous fluid, solution, or gelled liquid with gelling agents. The permeability modifier may not leave any residue in the formation pores and the subsequent treatment fluid should be able to push the permeability modifier further into the subterranean formation from the near well bore region.

As discussed above, the permeability modifier may be used in subterranean formations comprising zones with a wide range of permeabilities. Without limitation, the permeability modifiers may be used in subterranean formations comprising a zone with a permeability in a range including any of and between any of about 30 mD to about 13,000 mD. For example, the subterranean formation may comprise a zone with a permeability of about 30 mD, about 100 mD, about 200 mD, about 500 mD, about 750 mD, about 1000 mD, or about 13000 mD. One of ordinary skill in the art, with the benefit of this disclosure, should be able to recognize an appropriate subterranean formation in which to use the permeability modifiers.

The permeability modifier may be used to reduce the permeability of a zone in a near wellbore region of a subterranean formation. The permeability modifier may reduce the permeability of the zone in any desired amount. Without limitation, the permeability modifier may reduce the permeability of the zone in an amount in a range including any of and between any of about 1% to about 99%, wherein 100% represents a complete seal (e.g., 0 mD).

In some consolidation treatments, the high permeability zone may comprise a flow path. The permeability modifier may form a barrier in the high permeability zone to reduce flow through the flow path, thereby reducing the flow of subsequently pumped treatment fluids through the flow path. Examples of the types of flow paths that may have their permeability reduced by the permeability modifier include, but are not limited to, perforations, such as those formed by a perforation gun, fissures, cracks, fractures, streaks, flow channels, voids, high permeable streaks, annular voids, or combinations thereof, as well as any other high permeability zone in the formation through which fluids may undesirably flow.

As discussed above and as will be appreciated by those of ordinary skill in the art, the permeability modifier may be used in a variety of subterranean operations where it is desirable to reduce the flow of unwanted solids. Methods of using the permeability modifier may first include preparing the permeability modifier. The permeability modifier may be prepared in any suitable manner, for example, by combining the components, if multiple components are used, in any suitable order. The permeability modifier may be used as a single step treatment in which the permeability modifier is introduced to the near wellbore region of the subterranean formation. Alternatively, the permeability modifier may be used as a multi-step treatment in which the permeability modifier is mixed with a base fluid and/or additives to formulate a permeability modifier of sufficient viscosity before introduction into the near wellbore region of the subterranean formation.

Figure 2:
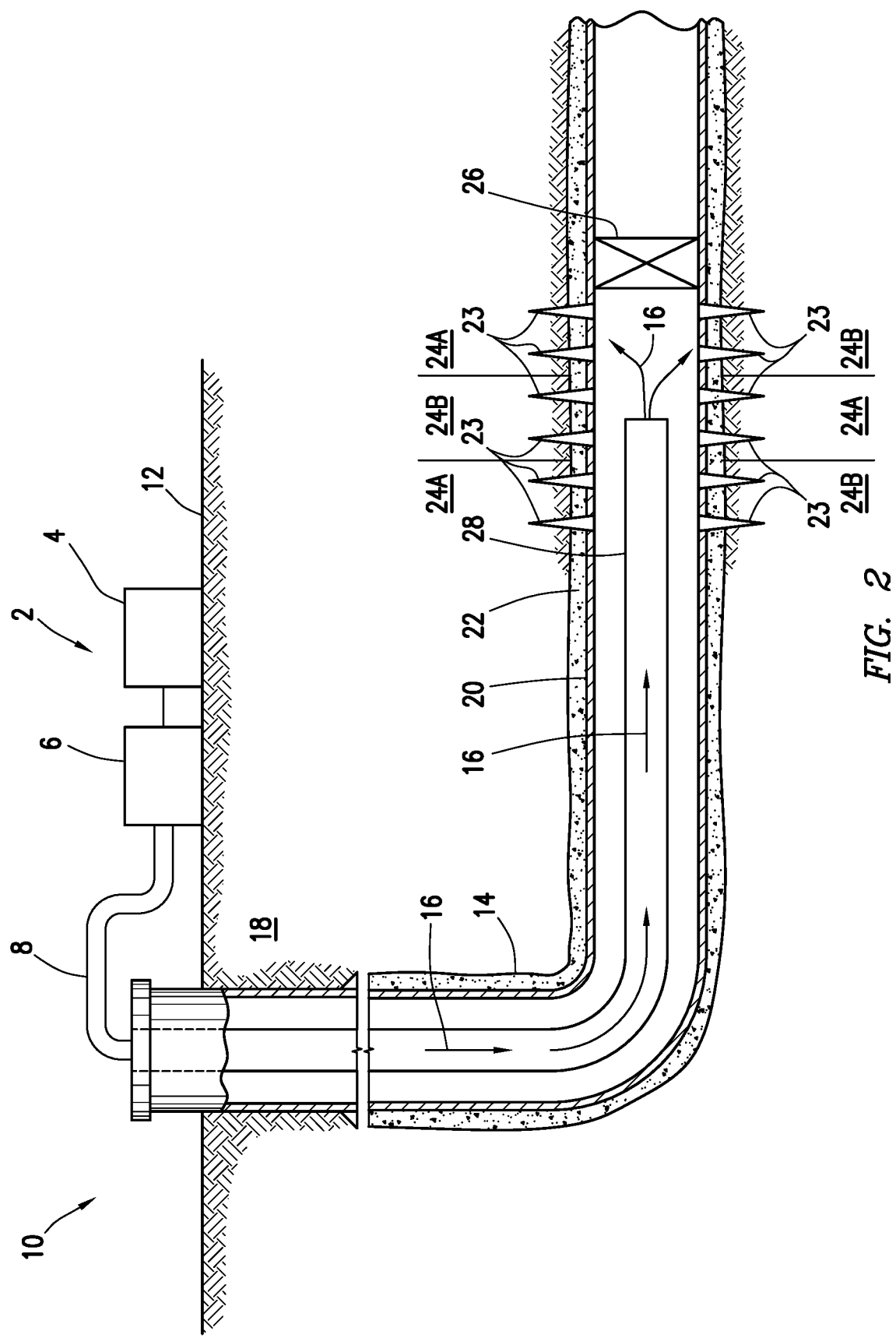
FIG. 2 is a schematic illustration of example well system showing placement of a permeability modifier into a wellbore.

A consolidation treatment method may be used in conjunction with one or more of the methods, compositions, and/or systems illustrated in FIGS. 1 and 2. The method may comprise introducing a permeability modifier into a subterranean formation comprising zones of heterogeneous permeability; introducing a treatment fluid into the subterranean formation subsequent to the permeability modifier, wherein the permeability modifier at least partially diverts the treatment fluid in the subterranean formation such that treatment of the subterranean formation with the treatment fluid is more uniform, and wherein the permeability modifier has a higher viscosity than the treatment fluid; and consolidating one or more zones of the subterranean formation. The method may further comprise pumping the permeability modifier from a fluid supply and into a wellbore via a wellbore supply conduit fluidically coupled to the wellbore, the wellbore penetrating the subterranean formation. The permeability modifier may be a liquid having a viscosity of about 3 cP to about 3000 cP. The permeability modifier may be selected from the group consisting of silicone oils, polyacrylamide, mineral oil, paraffin oil, kerosene oil, diesel oil, castor oil, corn oil, peanut oil, olive oil, palm oil, soybean oil, epoxy-based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, bisphenol A diglycidyl ether resins, butoxymethyl butyl glycidyl ether resins, bisphenol A-epichlorohydrin resins, bisphenol F resins, glycidyl ether resins, polyester resins and hybrids and copolymers thereof, polyurethane resins and hybrids and copolymers thereof, acrylate resins, bis-(2-hydroxyethyl) isodecyloxypropylamine, poly (5) oxyethylene isodecyloxypropylamine, bis-(2-hydroxyethyl) isotridecyloxypropylamine, poly (5) oxyethylene isotridecyloxypropyl amine, bis-(2-hydroxyethyl) linear alkyloxypropylamine, bis (2-hydroxyethyl) soya amine, poly (15) oxyethylene soya amine, bis (2-hydroxyethyl) octadecylamine, poly (5) oxyethylene octadecylamine, poly (8) oxyethylene octadecylamine, poly (10) oxyethylene octadecylamine, ethylene diamine, 1,3-diaminopropane, hexamethylenediamine, derivatives thereof, and combinations thereof. The permeability modifier may comprise about 10% to about 50% of the volume of the treatment fluid. The permeability fluid may be about 2 to about 5 times more viscous than the treatment fluid. The zones of heterogeneous permeability may comprises permeabilities in a range of about 30 mD to about 13,000 mD. The treatment fluid may be a consolidating treatment fluid. The permeability modifier may reduce the permeability of a zone of the subterranean formation in an amount between about 1% to about 99%.

A consolidation treatment method may be used in conjunction with one or more of the methods, compositions, and/or systems illustrated in FIGS. 1 and 2. The method may comprise introducing a permeability modifier into a subterranean formation, wherein the permeability modifier comprises a viscous liquid; introducing a consolidating treatment fluid into the subterranean formation subsequent to the permeability modifier, wherein the permeability modifier at least partially diverts the treatment fluid in the subterranean formation such that treatment of the subterranean formation with the treatment fluid is more uniform, and wherein the permeability modifier has a higher viscosity than the treatment fluid; and allowing the consolidating treatment fluid to consolidate at least a portion of the subterranean formation. The method may further comprise introducing another volume of the permeability modifier into the subterranean formation prior to introduction of a pre-flush fluid for the consolidating treatment fluid, and introducing the pre-flush fluid into the subterranean formation. The method may further comprise introducing another volume of the permeability modifier into the subterranean formation prior to introduction of a post-flush fluid for the consolidating treatment fluid, and introducing the post-flush fluid into the subterranean formation. The method may further comprise pumping the permeability modifier from a fluid supply into a wellbore via a wellbore supply conduit fluidically coupled to the wellbore, the wellbore penetrating the subterranean formation. The permeability modifier may be a liquid having a viscosity of about 3 cP to about 3000 cP. The permeability modifier may be selected from the group consisting of silicone oils, polyacrylamide, mineral oil, paraffin oil, kerosene oil, diesel oil, castor oil, corn oil, peanut oil, olive oil, palm oil, soybean oil, epoxy-based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, bisphenol A diglycidyl ether resins, butoxymethyl butyl glycidyl ether resins, bisphenol A-epichlorohydrin resins, bisphenol F resins, glycidyl ether resins, polyester resins and hybrids and copolymers thereof, polyurethane resins and hybrids and copolymers thereof, acrylate resins, bis-(2-hydroxyethyl) isodecyloxypropylamine, poly (5) oxyethylene isodecyloxypropylamine, bis-(2-hydroxyethyl) isotridecyloxypropylamine, poly (5) oxyethylene isotridecyloxypropyl amine, bis-(2-hydroxyethyl) linear alkyloxypropylamine, bis (2-hydroxyethyl) soya amine, poly (15) oxyethylene soya amine, bis (2-hydroxyethyl) octadecylamine, poly (5) oxyethylene octadecylamine, poly (8) oxyethylene octadecylamine, poly (10) oxyethylene octadecylamine, ethylene diamine, 1,3-diaminopropane, hexamethylenediamine, derivatives thereof, and combinations thereof. The permeability modifier may comprise about 10% to about 50% of the volume of the treatment fluid. The permeability fluid may be about 2 to about 5 times more viscous than the treatment fluid. The zones of heterogeneous permeability may comprises permeabilities in a range of about 30 mD to about 13,000 mD. The treatment fluid may be a consolidating treatment fluid. The permeability modifier may reduce the permeability of a zone of the subterranean formation in an amount between about 1% to about 99%.

A well system may be used in conjunction with one or more of the methods, compositions, and/or systems illustrated in FIGS. 1 and 2. The system may comprise a permeability modifier; a consolidating treatment comprising a pre-flush fluid, consolidating treatment fluid, and a post-fluid, wherein the consolidating treatment fluid has a viscosity less than the permeability modifier; a fluid handling system comprising the permeability modifier and the consolidating treatment; and a conduit fluidically coupled to the fluid handling system and a wellbore. The fluid handling system may comprise a fluid supply and pumping equipment. The permeability modifier may be a liquid having a viscosity of about 3 cP to about 3000 cP. The permeability modifier may be selected from the group consisting of silicone oils, polyacrylamide, mineral oil, paraffin oil, kerosene oil, diesel oil, castor oil, corn oil, peanut oil, olive oil, palm oil, soybean oil, epoxy-based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, bisphenol A diglycidyl ether resins, butoxymethyl butyl glycidyl ether resins, bisphenol A-epichlorohydrin resins, bisphenol F resins, glycidyl ether resins, polyester resins and hybrids and copolymers thereof, polyurethane resins and hybrids and copolymers thereof, acrylate resins, bis-(2-hydroxyethyl) isodecyloxypropylamine, poly (5) oxyethylene isodecyloxypropylamine, bis-(2-hydroxyethyl) isotridecyloxypropylamine, poly (5) oxyethylene isotridecyloxypropyl amine, bis-(2-hydroxyethyl) linear alkyloxypropylamine, bis (2-hydroxyethyl) soya amine, poly (15) oxyethylene soya amine, bis (2-hydroxyethyl) octadecylamine, poly (5) oxyethylene octadecylamine, poly (8) oxyethylene octadecylamine, poly (10) oxyethylene octadecylamine, ethylene diamine, 1,3-diaminopropane, hexamethylenediamine, derivatives thereof, and combinations thereof. The permeability modifier may comprise about 10% to about 50% of the volume of the treatment fluid. The permeability fluid may be about 2 to about 5 times more viscous than the treatment fluid. The treatment fluid may be a consolidating treatment fluid. The permeability modifier may reduce the permeability of a zone of the subterranean formation in an amount between about 1% to about 99%.

Example methods of using the permeability modifiers will now be described in more detail with reference to FIGS. 1 and 2. Any of the previous examples of the permeability modifiers may apply in the context of FIGS. 1 and 2. Referring now to FIG. 1, a fluid handling system 2 is illustrated. The fluid handling system 1 may be used for preparation of the permeability modifier and for introduction of the permeability modifier into a wellbore. The fluid handling system 2 may include mobile vehicles, immobile installations, skids, hoses, tubes, fluid tanks or reservoirs, pumps, valves, and/or other suitable structures and equipment. For example, the fluid handling system 2 may include a fluid supply 4 and pumping equipment 6, both of which may be fluidically coupled with a wellbore supply conduit 8. The fluid supply 4 may contain the permeability modifier. The pumping equipment 6 may be used to supply the permeability modifier from the fluid supply 4, which may include tank, reservoir, connections to external fluid supplies, and/or other suitable structures and equipment. While not illustrated, the fluid supply 4 may contain one or more components (e.g., including optional such as base fluid, viscosifiers, etc.) of the permeability modifier in separate tanks or other containers that may be mixed at any desired time. Pumping equipment 6 may be fluidically coupled with the wellbore supply conduit 8 to communicate the permeability modifier into the wellbore. Fluid handling system 2 may also include surface and down-hole sensors (not shown) to measure pressure, rate, temperature and/or other parameters of treatment. Fluid handling system 2 may include pump controls and/or other types of controls for starting, stopping, and/or otherwise controlling pumping as well as controls for selecting and/or otherwise controlling fluids pumped during the injection treatment. An injection control system may communicate with such equipment to monitor and control the injection treatment. Fluid handling system 2 can be configured as shown in FIG. 1 or in a different manner, and may include additional or different features as appropriate. Fluid handling system 2 may be deployed via skid equipment, marine vessel, or may be comprised of sub-sea deployed equipment.

Turning now to FIG. 2, an example well system 10 is shown. As illustrated, the well system 10 may include a fluid handling system 2, which may include fluid supply 4, pumping equipment 6, and wellbore supply conduit 8. As previously described in connection with FIG. 1, pumping equipment 6 may be fluidically coupled with the wellbore supply conduit 8 to communicate the permeability modifier into wellbore 14. As depicted in FIG. 2, the fluid supply 4 and pumping equipment 6 may be above the surface 12 while the wellbore 14 is below the surface 12. Well system 10 may be configured as shown in FIG. 2 or in a different manner, and may include additional or different features as appropriate.

As illustrated on FIG. 2, the well system 10 may be used for introduction of a permeability modifier 16, described herein, into subterranean formation 18 surrounding the wellbore 14. Generally, a wellbore 14 may include horizontal, vertical, slanted, curved, and other types of wellbore geometries and orientations, and the permeability modifier 16 may generally be applied to subterranean formation 18 surrounding any portion of wellbore 14. As illustrated, the wellbore 14 may include a casing 20 that may be cemented (or otherwise secured) to wellbore wall by cement sheath 22. Perforations 23 allow treatment fluids (e.g., permeability modifier 16) and/or other materials to flow into and out of the subterranean formation 18. A plug 26, which may be any type of plug (e.g., bridge plug, etc.) may be disposed in wellbore 14 below the perforations 23 if desired.

The permeability modifier 16, may be pumped from fluid supply 4 down the interior of casing 20 in wellbore 14. As illustrated, well conduit 28 (e.g., coiled tubing, drill pipe, etc.) may be disposed in casing 20 through which the permeability modifier 16 may be pumped. The well conduit 28 may be the same or different than the wellbore supply conduit 8. For example, the well conduit 28 may be an extension of the wellbore supply conduit 8 into the wellbore 14 or may be tubing or other conduit that is coupled to the wellbore supply conduit 8. The permeability modifier 16 may be allowed to flow down the interior of well conduit 28, exit the well conduit 28, and finally enter subterranean formation 18 surrounding wellbore 14 by way of perforations 23 through the casing 20 (if the wellbore is cased as in FIG. 2) and cement sheath 24.

Permeability modifier 16 may then selectively enter the permeable zone or zones which possess the highest permeabilities, noted as high permeability zones 24A. Permeability modifier 16 may then. The permeable zones with lower permeabilities, noted as low permeability zones 24B may not comprise the permeability modifier 16 or may comprise a reduced amount of permeability modifier 16 as compared to the high permeability zones 24A. Once permeability modifier 16 has been introduced, a subsequent fluid, for example a pre-flush fluid, may be introduced into the perforations 23 of subterranean formation 18 surrounding wellbore 14. The viscous permeability modifier 16 disposed within the high permeability zones 24A reduces fluid flow into those high permeability zones 24A. Thus the permeability of the high permeability zones 24A may approach that of the low permeability zones 24B, and the subsequent fluid may flow into both the high permeability zones 24A and the low permeability zones 24B in a more evenly distributed amount. The permeability modifier 16 may continue to flow through the high permeability zones 24A over time and/or may be pushed further into the high permeability zones 24A such that the permeability modifier is no longer within the a near wellbore region of the subterranean formation 18 and the permeability of the high permeability zones 24A may revert to previous levels.

The exemplary permeability modifiers disclosed herein may directly or indirectly affect one or more components or pieces of equipment associated with the preparation, delivery, recapture, recycling, reuse, and/or disposal of the permeability modifiers. For example, the permeability modifiers may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the permeability modifiers. The permeability modifier may also directly or indirectly affect any transport or delivery equipment used to convey the permeability modifier to a well site or downhole such as, for example, any transport vessels, conduits, pipelines, trucks, tubulars, and/or pipes used to compositionally move the permeability modifier from one location to another, any pumps, compressors, or motors (e.g., topside or downhole) used to drive the permeability modifier into motion, any valves or related joints used to regulate the pressure or flow rate of the resin composition and spacer fluids (or fluids containing the same permeability modifier, and any sensors (i.e., pressure and temperature), gauges, and/or combinations thereof, and the like. The disclosed permeability modifier may also directly or indirectly affect the various downhole equipment and tools that may come into contact with the permeability modifiers such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

EXAMPLES

To facilitate a better understanding of the present embodiments, the following examples of some of the preferred embodiments are given. In no way should such examples be read to limit, or to define, the scope of the disclosure.

Example 1

Figure 3:
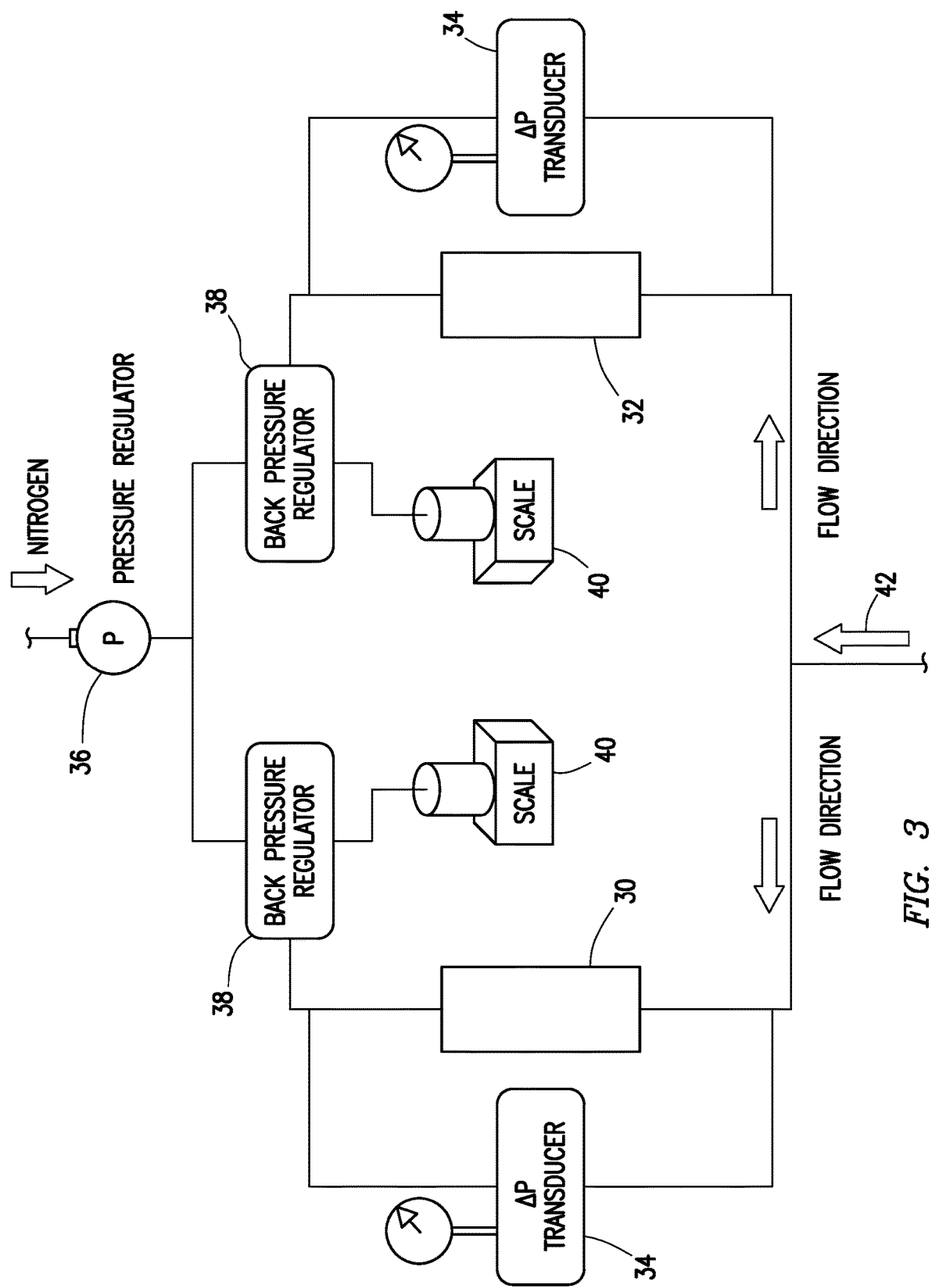
FIG. 3 is a schematic illustration of an example apparatus used to compare permeabilities of sand packs.

Two sand packs were prepared using SSA-2™ Strength-Stabilizing Agent available from Halliburton Energy Services, Inc. of Houston, Tex.; MICROSAND™ Cement Additive available from Halliburton Energy Services, Inc. of Houston, Tex.; and Bentonite clay. One of the sand packs possessed a permeability of 200 mD. The other sand pack possessed a permeability of 1000 mD. The components of the 200 mD sand pack were used in an SSA-2™:MICROSAND™:Bentonite Clay ratio of 85:13:2. The components of the 1000 mD sand pack were used in an SSA-2™:MICROSAND™:Bentonite Clay ratio of 92:6:2 Both sand packs had a pore volume of roughly 20 mL. The sand packs were connected in parallel as illustrated according to the apparatus of FIG. 3. These sand packs were used to represent formation materials. The initial permeability of the sand pack was measured by using a 3% KCl brine at a flow rate of 5 mL/min. and the change in pressure was noted. Permeability was then calculated as per Darcy's law.

The 200 mD sand pack is illustrated as sand pack 30. The 1000 mD sand pack is illustrated as sand pack 32. Pressure transducers 34 were coupled adjacent to both the inflow and outflow of each sand pack 30 and 32 and were used to measure pressure difference (ΔP) across the sand packs 30 and 32. Back pressure regulation was controlled through the input of nitrogen at point 36 as shown. Back pressure was regulated at points 38 as shown. Scales 40 were used to measure fluid volume rate passing through the sand packs 30 and 32.

A permeability modifier comprising silicone oil was injected at point 42 and proceeded to flow towards both sand packs. One pore volume of the permeability modifier was used and the permeability modifier possessed a viscosity of 300 cP. Three fluids were pumped subsequent to the permeability modifier in separate tests to measure the flow rates and volumes passing through each sand pack after treatment with the permeability modifier. The fluids were LCA-1, an organic solvent available from Halliburton Energy Services of Houston, Tex.; methanol; and SandTrap® 225 resin an epoxy available from Halliburton Energy Services of Houston, Tex.

Figure 4A:
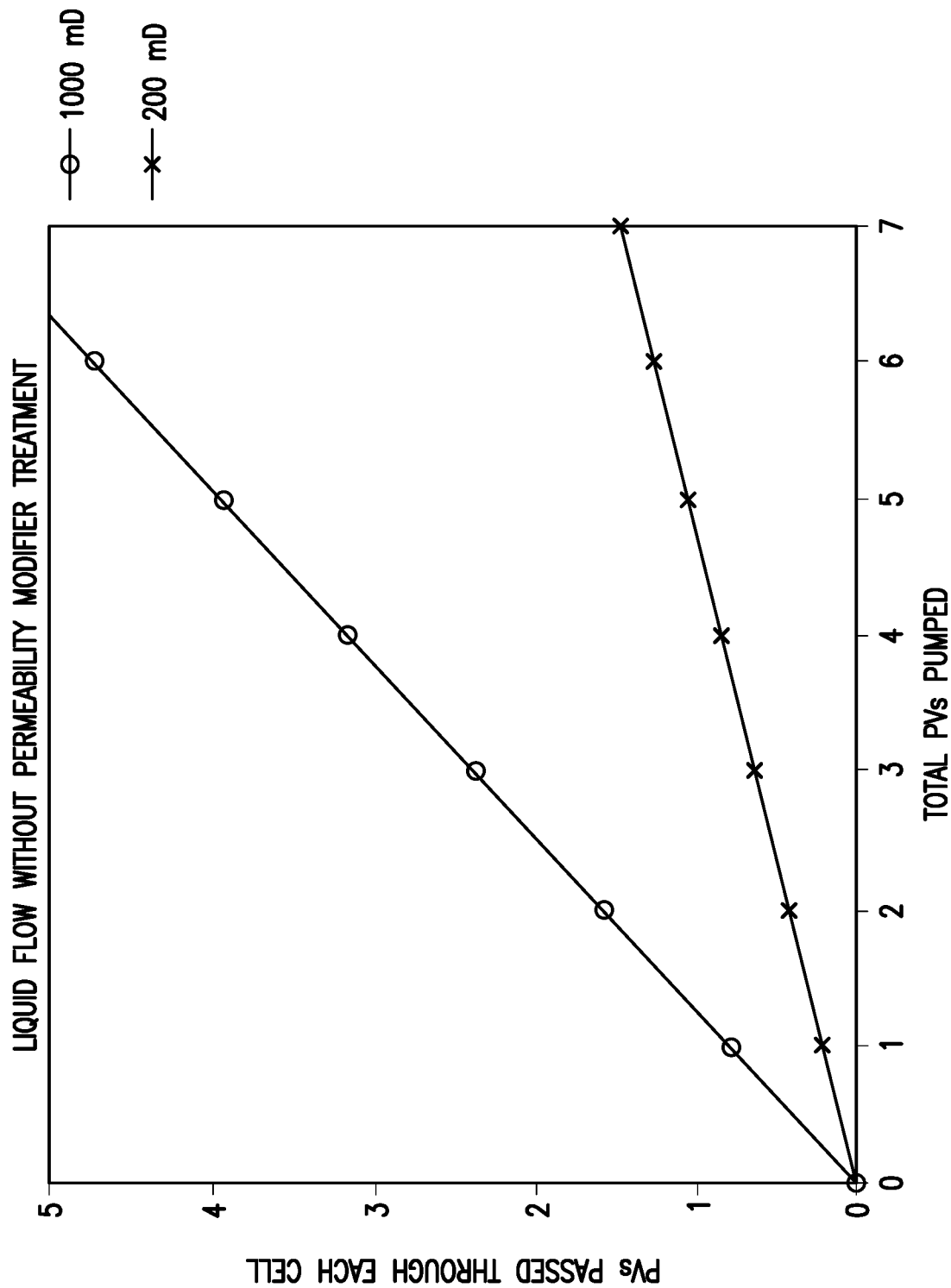
FIG. 4A is a graph illustrating the permeabilities of two sand packs.
Figure 4B:
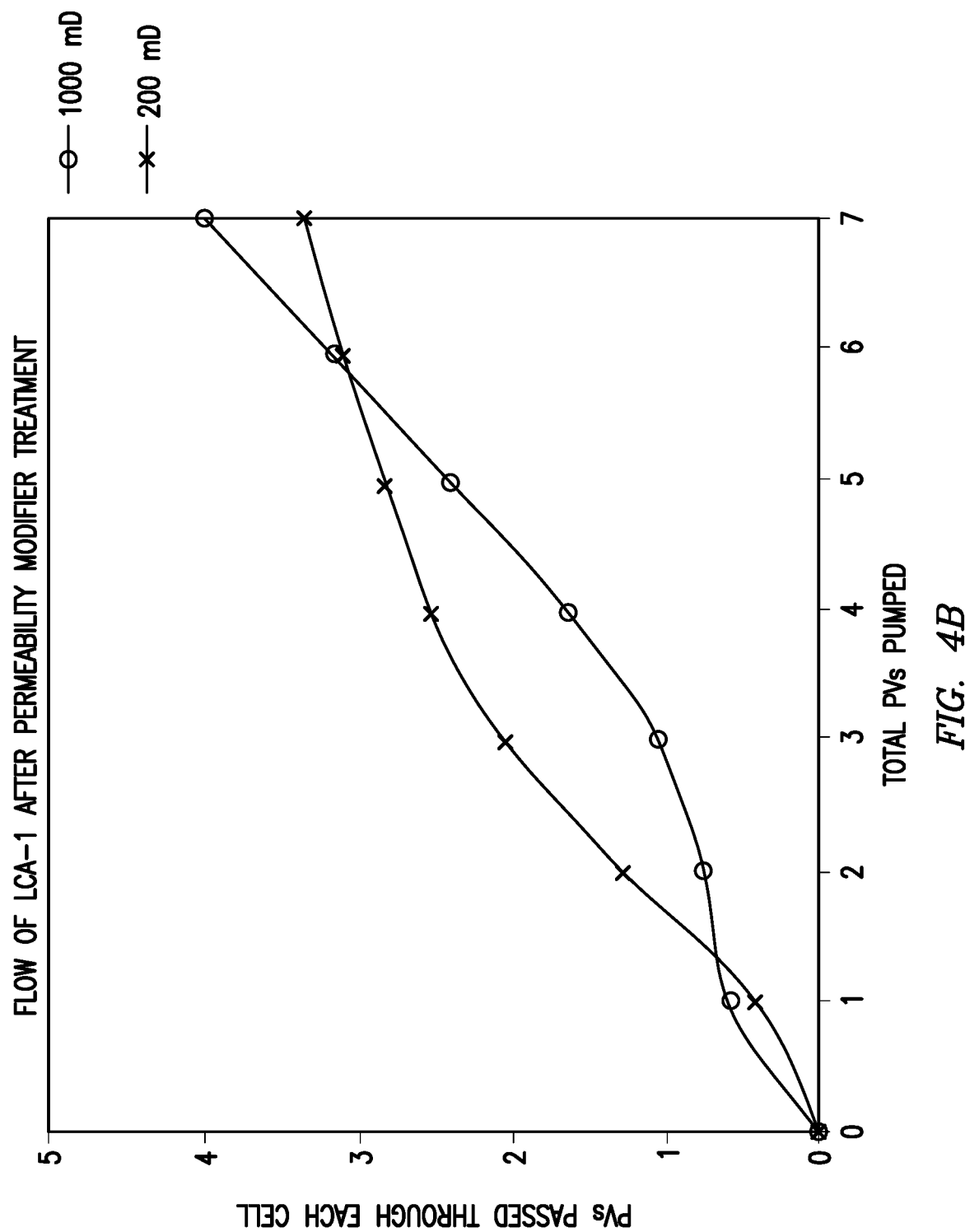
FIG. 4B is a graph illustrating the permeabilities of two sand packs after treatment with a permeability modifier.
Figure 4C:
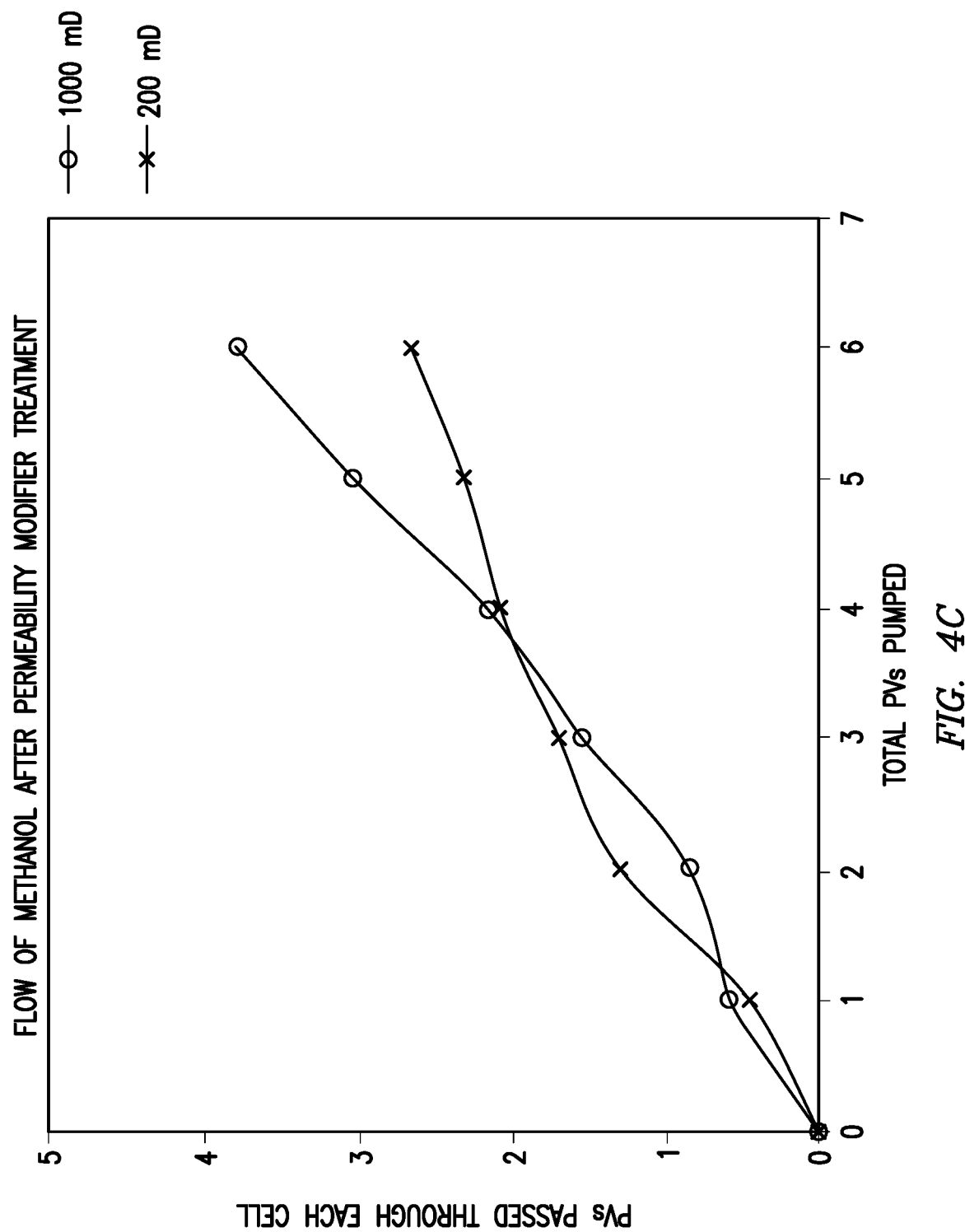
FIG. 4C is another graph illustrating the permeabilities of two sand packs after treatment with a permeability modifier.

FIG. 4A is a control and illustrates flow through the sand pack without the permeability modifier, as measured by the 3% KCl brine as discussed above. FIG. 4B illustrates LCA-1 flow through the sand packs. FIG. 4C illustrates methanol flow through the sand packs. FIG. 4D illustrates Sandtrap® 225 resin flow through the sand packs. Each Figure (FIGS. 4A-4D) chart the pore volumes of their respective fluids passed through each sand pack after the 1 pore volume treatment with the permeability modifier, plotted against the total pore volumes of their respective fluids that were pumped.

The data illustrates that a permeability modifier may be used to adjust the permeability of a zone or zones with differing permeabilities such that the differing permeabilities may approach parity for a subsequently pumped fluid.

Example 2

Figure 5:
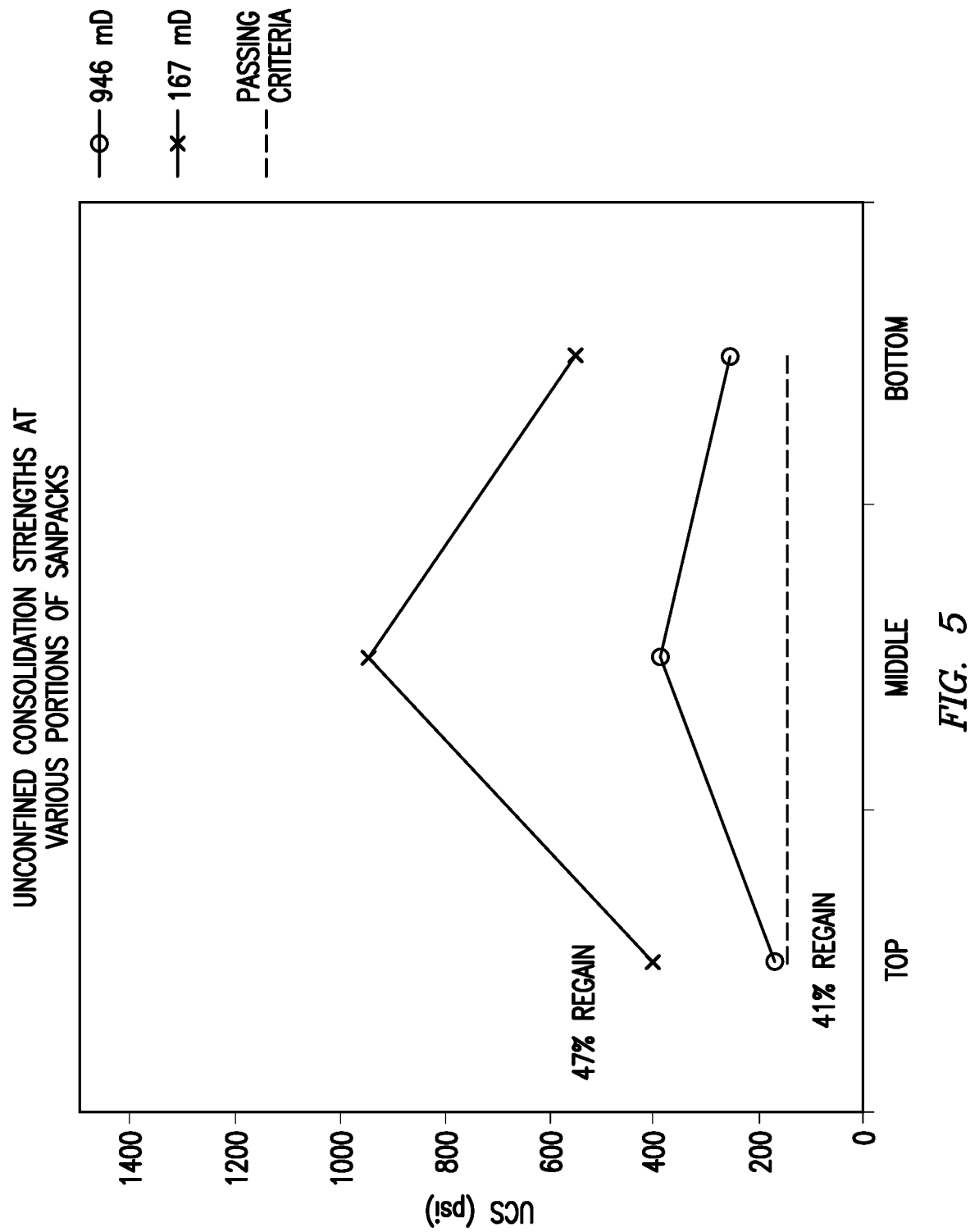
FIG. 5 is a graph illustrating the unconfined consolidation strength of a sand packs after treatment with a permeability modifier.

For the sample of FIG. 4D, which used Sandtrap® 225 resin as the subsequent treatment fluid, the unconfined compressive strengths were obtained from different sections of the treated sand packs. The unconfined compressive strength was measured on consolidated sand packs after cutting them into cylindrical shapes and applying pressure until the break point occurred. The force at break point is equivalent to the unconfined compressive strength. The unconfined compressive strengths and the regain permeabilities were plotted as illustrated in FIG. 5. The unconfined compressive strengths for both sand packs were above the passing criteria and both sand packs also had acceptable regain permeabilities.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A consolidation treatment method comprising:
    introducing a permeability modifier into a subterranean formation comprising zones of heterogeneous permeability;
    introducing a treatment fluid into the subterranean formation subsequent to the permeability modifier, wherein the permeability modifier at least partially diverts the treatment fluid in the subterranean formation such that treatment of the subterranean formation with the treatment fluid is more uniform, and wherein the permeability modifier is about 2 to about 5 times more viscous than the treatment fluid; and consolidating one or more zones of the subterranean formation.

2. The method of claim 1, further comprising pumping the permeability modifier from a fluid supply and into a wellbore via a wellbore supply conduit fluidically coupled to the wellbore, the wellbore penetrating the subterranean formation.

3. The method of claim 1, wherein the permeability modifier is a liquid and has a viscosity of about 3 cP to about 3000 cP.

4. The method of claim 1, wherein the permeability modifier is selected from the group consisting of silicone oils, polyacrylamide, mineral oil, paraffin oil, kerosene oil, diesel oil, castor oil, corn oil, peanut oil, olive oil, palm oil, soybean oil, epoxy-based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, bisphenol A diglycidyl ether resins, butoxymethyl butyl glycidyl ether resins, bisphenol A-epichlorohydrin resins, bisphenol F resins, glycidyl ether resins, polyester resins and hybrids and copolymers thereof, polyurethane resins and hybrids and copolymers thereof, acrylate resins, bis-(2-hydroxyethyl) isodecyloxypropylamine, poly (5) oxyethylene isodecyloxypropylamine, bis-(2-hydroxyethyl) isotridecyloxypropylamine, poly (5) oxyethylene isotridecyloxypropyl amine, bis-(2-hydroxyethyl) linear alkyloxypropylamine, bis (2-hydroxyethyl) soya amine, poly (15) oxyethylene soya amine, bis (2-hydroxyethyl) octadecylamine, poly (5) oxyethylene octadecylamine, poly (8) oxyethylene octadecylamine, poly (10) oxyethylene octadecylamine, ethylene diamine, 1,3-diaminopropane, hexamethylenediamine, derivatives thereof, and combinations thereof.

5. The method of claim 1, wherein the permeability modifier comprises about 10% to about 50% of the volume of the treatment fluid.

6. The method of claim 1, wherein the zones of heterogeneous permeability comprises permeabilities in a range of about 30 mD to about 13,000 mD.

7. The method of claim 1, wherein the treatment fluid is a consolidating treatment fluid.

8. The method of claim 1, wherein the permeability modifier reduces the permeability of a zone of the subterranean formation in an amount between about 1% to about 99%.

9. A consolidation treatment method comprising:
introducing a permeability modifier into a subterranean formation, wherein the permeability modifier comprises a viscous liquid;
introducing a consolidating treatment fluid into the subterranean formation subsequent to the permeability modifier, wherein the permeability modifier at least partially diverts the treatment fluid in the subterranean formation such that treatment of the subterranean formation with the treatment fluid is more uniform, and wherein the permeability modifier is about 2 to about 5 times more viscous than the consolidating treatment fluid; and allowing the consolidating treatment fluid to consolidate at least a portion of the subterranean formation.

10. The method of claim 9, further comprising introducing another volume of the permeability modifier into the subterranean formation prior to introduction of a pre-flush fluid for the consolidating treatment fluid, and introducing the pre-flush fluid into the subterranean formation.

11. The method of claim 10, further comprising introducing another volume of the permeability modifier into the subterranean formation prior to introduction of a post-flush fluid for the consolidating treatment fluid, and introducing the post-flush fluid into the subterranean formation.

12. The method of claim 9, further comprising pumping the permeability modifier from a fluid supply and into a wellbore via a wellbore supply conduit fluidically coupled to the wellbore, the wellbore penetrating the subterranean formation.

13. The method of claim 9, wherein the permeability modifier possesses a viscosity of about 3 cP to about 3000 cP.

14. The method of claim 9, wherein the permeability modifier is selected from the group consisting of silicone oils, polyacrylamide, mineral oil, paraffin oil, kerosene oil, diesel oil, castor oil, corn oil, peanut oil, olive oil, palm oil, soybean oil, epoxy-based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, bisphenol A diglycidyl ether resins, butoxymethyl butyl glycidyl ether resins, bisphenol A-epichlorohydrin resins, bisphenol F resins, glycidyl ether resins, polyester resins and hybrids and copolymers thereof, polyurethane resins and hybrids and copolymers thereof, acrylate resins, bis-(2-hydroxyethyl) isodecyloxypropylamine, poly (5) oxyethylene isodecyloxypropylamine, bis-(2-hydroxyethyl) isotridecyloxypropylamine, poly (5) oxyethylene isotridecyloxypropyl amine, bis-(2-hydroxyethyl) linear alkyloxypropylamine, bis (2-hydroxyethyl) soya amine, poly (15) oxyethylene soya amine, bis (2-hydroxyethyl) octadecylamine, poly (5) oxyethylene octadecylamine, poly (8) oxyethylene octadecylamine, poly (10) oxyethylene octadecylamine, ethylene diamine, 1,3-diaminopropane, hexamethylenediamine, derivatives thereof, and combinations thereof.

15. The method of claim 9, wherein the permeability modifier comprises about 10% to about 50% of the volume of the consolidating treatment fluid.

16. A well system comprising:
a permeability modifier;
a consolidating treatment comprising a pre-flush fluid, consolidating treatment fluid, and a post-fluid, wherein the permeability modifier is about 2 to about 5 times more viscous than the consolidating treatment fluid;
a fluid handling system comprising the permeability modifier and the consolidating treatment; and
a conduit fluidically coupled to the fluid handling system and a wellbore.

17. The well system of claim 16, wherein the fluid handling system comprises a fluid supply and pumping equipment.

18. The well system of claim 16, wherein the permeability modifier comprises about 10% to about 50% of the volume of the consolidating treatment fluid.

* * * * *